United States Patent
Zelenov et al.

(10) Patent No.: US 10,776,148 B1
(45) Date of Patent: Sep. 15, 2020

(54) SYSTEM AND METHOD FOR UTILIZING COMPUTATIONAL POWER OF A SERVER FARM

(71) Applicant: Parallels International GmbH, Schaffhausen (CH)

(72) Inventors: Anton Zelenov, Moscow (RU); Nikolay Dobrovolskiy, Moscow (RU); Serguei M. Beloussov, Costa Del Sol (SG)

(73) Assignee: Parallels International GmbH, Schaffhausen (CH)

( * ) Notice: Subject to any disclaimer, the term of this patent is extended or adjusted under 35 U.S.C. 154(b) by 97 days.

(21) Appl. No.: 15/889,323

(22) Filed: Feb. 6, 2018

(51) Int. Cl.
  *G06F 9/455* (2018.01)
  *G06F 3/06* (2006.01)

(52) U.S. Cl.
  CPC .......... *G06F 9/45558* (2013.01); *G06F 3/065* (2013.01); *G06F 3/067* (2013.01); *G06F 3/0625* (2013.01); *G06F 3/0689* (2013.01); *G06F 2009/45562* (2013.01); *G06F 2009/45583* (2013.01)

(58) Field of Classification Search
  None
  See application file for complete search history.

(56) References Cited

U.S. PATENT DOCUMENTS

| | | | | |
|---|---|---|---|---|
| 8,549,518 B1 * | 10/2013 | Aron | .................. | G06F 9/45558 |
| | | | | 718/1 |
| 9,378,161 B1 * | 6/2016 | Dalal | ...................... | G06F 13/16 |
| 2010/0162230 A1 * | 6/2010 | Chen | ..................... | G06F 9/5072 |
| | | | | 717/177 |
| 2014/0047341 A1 * | 2/2014 | Breternitz | ............... | G06F 9/505 |
| | | | | 715/735 |
| 2014/0372611 A1 * | 12/2014 | Matsuda | ................. | H04L 45/12 |
| | | | | 709/225 |

(Continued)

FOREIGN PATENT DOCUMENTS

EP          2746948 A1 *    6/2014    ........... G06F 9/5066

OTHER PUBLICATIONS

Lagar-Cavilla, Horacio Andrés, et al. "SnowFlock: rapid virtual machine cloning for cloud computing." Proceedings of the 4th ACM European conference on Computer systems. ACM, 2009. (Year: 2009).*

(Continued)

*Primary Examiner* — Charles Rones
*Assistant Examiner* — Hewy H Li
(74) *Attorney, Agent, or Firm* — Lowenstein Sandler LLP (57) ABSTRACT

Disclosed are systems and methods for parallel processing an input data set. During a map stage of a computation, starting with a first virtual machine (VM) acting as a parent VM and an input data set, the system clones the parent VM to generate at least one linked clone child VM. The system further divides the input data set into a first chunk for the parent VM and a second chunk for the at least one child VM by determining a starting pointer for each chunk. Each chunk is processed by a VM to generate an intermediate data result, which is stored in a network storage device. The plurality of VMs then perform a reduce stage on the plurality of intermediate data results stored in the network storage device.

16 Claims, 6 Drawing Sheets

(56) References Cited

U.S. PATENT DOCUMENTS

| | | | | |
|---|---|---|---|---|
| 2015/0178110 A1* | 6/2015 | Li | .................... | G06F 9/45558 |
| | | | | 718/1 |
| 2015/0277952 A1* | 10/2015 | Lin | .................... | G06F 9/45558 |
| | | | | 711/114 |
| 2016/0124992 A1* | 5/2016 | Alesiani | ................ | G06F 9/5033 |
| | | | | 707/737 |
| 2017/0024251 A1* | 1/2017 | Yi | .................... | G06F 9/5061 |
| 2017/0371707 A1* | 12/2017 | Zou | .................... | G06F 9/45558 |

OTHER PUBLICATIONS

Dean, Jeffrey, and Sanjay Ghemawat. "MapReduce: simplified data processing on large clusters." Communications of the ACM 51.1 (2008): 107-113. (Year: 2008).*

Khatchadourian, Shahan, and Julia Rubin. "Cloning Strategies for MapReduce." University of Toronto. Dec 17, 2010. <http://www.cs.utoronto.ca/~mjulia/CSC2231Project/FinalReport.pdf>. (Year: 2010).*

Lee, Kyong-Ha, et al. "Parallel data processing with MapReduce: a survey." AcM sIGMoD Record 40.4 (2012): 11-20. (Year: 2011).*

Aarnio, Tomi. "Parallel data processing with MapReduce." TKK T-110.5190, Seminar on Internetworking. 2009. (Year: 2009).*

\* cited by examiner

SYSTEM AND METHOD FOR UTILIZING COMPUTATIONAL POWER OF A SERVER FARM

FIELD OF TECHNOLOGY

The present disclosure relates generally to the field of computational processing, more specifically, to systems and methods of computational processing data sets in a parallelized manner.

BACKGROUND

Large-scale data processing generally involve extracting data of interest from raw data contained in one or more input datasets and processing the extracted data into a useful product. One known technique of data processing is MapReduce, which refers to a programming model and an associated implementation for processing and generating large data sets with a parallel, distributed algorithm on distributed servers (nodes), collectively referred to as a cluster. A MapReduce program is generally comprised of a Map( ) procedure that performs filtering and sorting, and a Reduce( ) procedure that performs a summary operation. The MapReduce framework orchestrates the data processing by marshalling the distributed servers, running various tasks in parallel, managing all communications and data transfers between the various parts of the system, and providing for redundancy and fault tolerance.

The MapReduce framework is traditionally executed on large clusters of hardware computer servers (i.e., on the order of hundreds or thousands of machines) connected together with a switched Ethernet, in which machine failures are common and even expected. For example, each worker node may be a thread or process executing on a commodity personal computer (PC), having directly-attached, inexpensive hard drives. However, such specialized implementations are unorthodox compared to traditional data centers and may be costly to difficult, particularly for users with light to medium data processing needs.

SUMMARY

A system and method is disclosed herein for computational processing data sets in a parallelized manner, and, more particularly, for performing data processing using a cluster that is dynamically created from virtual machines distributed over a server farm.

In one exemplary aspect, a computer-implemented method for parallel processing an input data set is provided. The method includes performing a map stage of a computation, starting with a first virtual machine (VM) acting as a parent VM and an input data set, by: cloning the parent VM to generate at least one child VM, wherein the child VM comprises a linked clone VM executing on a same host as the parent VM, dividing the input data set into a first chunk for the parent VM and a second chunk for the at least one child VM by determining a starting pointer for each chunk, processing each chunk, using the corresponding first VM or child VM, to generate an intermediate data result, and storing each intermediate data result in a network storage device. The method further includes performing a reduce stage on the plurality of intermediate data results stored in the network storage device using the first VM and the at least one child VM.

In another aspect, dividing the input data set further includes dividing the input data set into a plurality of chunks having a predetermined chunk size, wherein the plurality of chunks includes the first chunk and the second chunk.

In another aspect, cloning the parent VM and dividing the input data set further includes cloning the parent VM to generate a child VM, and dividing the input data set into the first chunk for the parent VM and the second chunk for the child VM, in an iterative or recursive manner, with each corresponding chunk acting as the input data set for a next iteration, and with each corresponding VM acting as the parent VM for the next iteration, and until a threshold size of the input data set has been reached.

In another aspect, cloning the parent VM and dividing the input data set further includes cloning the parent VM to generate a child VM, and dividing the input data set into the first chunk for the parent VM and the second chunk for the child VM, in an iterative or recursive manner, with the first chunk acting as the input data set for a next iteration, and until the threshold size of the input data set has been reached.

In another aspect, each of the child VMs is also performing the step of cloning the parent VM and dividing the input data set in an iterative or recursive manner, with the second chunk acting as the input data set for a next iteration, and with the child VM acting as the parent VM for the next iteration.

In another aspect, the input data set is iteratively divided into two equal portions.

In another aspect, the cloning and dividing steps are performed until a threshold maximum count of child VMs is reached.

In another aspect, the method further includes performing a live migration of the at least one child VM to a second host, wherein the at least one child VM is cloned in an iterative or recursive manner on the second host.

In another exemplary aspect, a system for parallel processing an input data set is provided. The system includes a hardware processor configured to perform a map stage of a computation, starting with a first virtual machine (VM) acting as a parent VM and an input data set, by: cloning the parent VM to generate at least one child VM, wherein the child VM comprises a linked clone VM executing on a same host as the parent VM, dividing the input data set into a first chunk for the parent VM and a second chunk for the at least one child VM by determining a starting pointer for each chunk, processing each chunk, using the corresponding first VM or child VM, to generate an intermediate data result, and storing each intermediate data result in a network storage device. The hardware processor is further configured to perform a reduce stage on the plurality of intermediate data results stored in the network storage device using the first VM and the at least one child VM.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for parallel processing an input data set. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
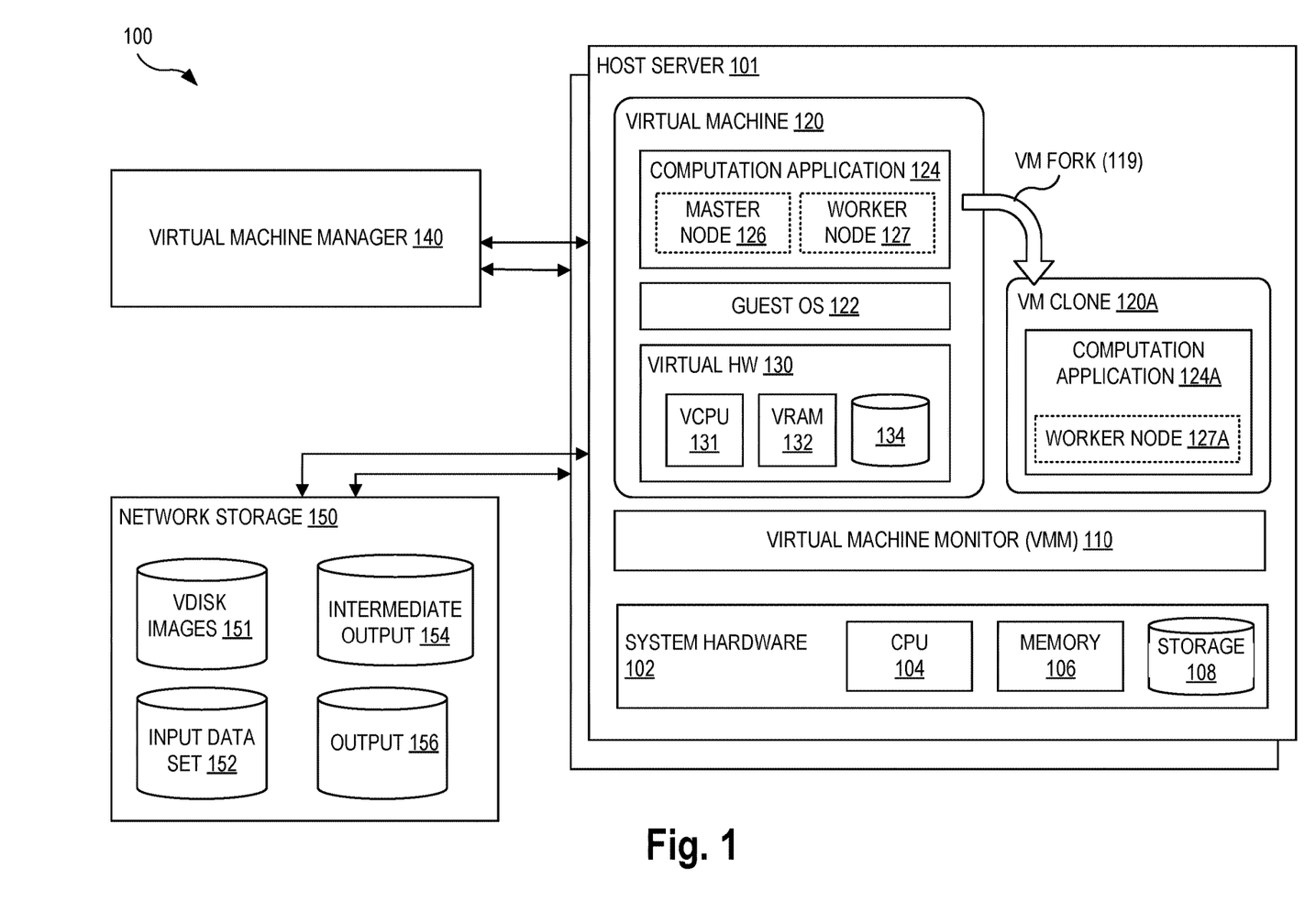
FIG. 1 is a block diagram illustrating a system for parallel processing an input data set, according to an exemplary aspect.

FIG. 1 is a block diagram illustrating a system 100 for parallel processing an input data set, according to an exemplary aspect. The system 100 includes a plurality of host servers 101, collectively sometimes referred to as a server farm or data center. As shown, the system 100 generally includes one or more virtual machines 120 that can be created on a host 101 that includes system hardware 102, a host operating system 114, and a virtual machine monitor 110 (also known as a hypervisor or a virtualizer). The system 100 further includes a network storage device 150 communicatively connected to the hosts 101 and configured to store data associated with the VMs as described in greater detail below.

The virtual machine monitor 110 (hereinafter referred to as "VMM 110") provides a guest operating system 122 of the virtual machine 120 with a virtual operating platform (depicted as virtual hardware 130) and manages execution of the guest OS 122. The VMM 110 may run directly on the underlying system hardware 102 or as an application or component running within a host operating system (not shown) installed on the system hardware 102. Exemplary operations of a VMM 110 in various configurations are described in greater detail in U.S. Pat. No. 7,865,893 B1, "System and Method for Starting Virtual Machine Monitor in Common with Already Installed Operating System", which is incorporated herein by reference in its entirety.

The host 101 may be any computing device, physical server, computer server, desktop, laptop, handheld device, tablet device, smartphone, or any other electronic device suitable for implementing virtualization as described herein. As shown, the system hardware 102 of a host can include at least one computer processing unit (CPU) 104, memory 106 (e.g., random access memory), and storage devices 108 (e.g., hard disk drives). The host 101 may include additional devices, software modules, and the like, as would be appreciated to one skilled in the art, but are not shown herein so as to not unnecessarily obscure the aspects of the disclosure. As software, the code for the VM 120 will typically execute on the actual system hardware 102.

In the exemplary aspect, the virtual machine 120 has both virtual system hardware 130 and guest system software, including the guest OS 122. The virtual system hardware 130 can include a virtual CPU 131, virtual memory 132, a virtual disk 134, as well as other virtual hardware components, such as a virtual network interface. It is noted that all of the virtual hardware components of the virtual machine 120 can be implemented in software to emulate corresponding physical components, for example, using a virtual device emulator module. The VMM 110 acts as the interface between guest software executing within the VM 120, including the guest OS 122, and the hardware components and devices in the underlying system hardware platform 102 of the host machine.

In general, it should be appreciated that the disclosed system and method is described herein in the context of a hosted virtualized computing system. However, in alternative aspects, the system and method may be implemented for a non-hosted virtualized computer system, and may also be implemented directly in a computer's primary OS, both where the OS is designed to support virtual machines and where the OS does not support virtual machines.

The system 100 further includes a virtual machine (VM) manager 140 configured to perform cloning operations on any of the VMs 120, as well as migrate operations to load balance or more VMs 120 across a plurality of hosts 101 in the system 100. In some aspects, the VM manager 140 may be executing as a separate software service on a same or different host as the VMs 120. In another aspect, the VM manager 140 may be integrated into a host operating system of one or more of the hosts 101. In an aspect, the VM manager 140 may announce itself over a network connection and software running in the guest OS 122 (e.g., computation application 124) can receive such announcement and store the VM manager address in memory.

In one aspect, at least one of the virtual machines 120 includes a computation application 124 configured to perform one or more computations on an input data set 152. In some aspects, the computation application 124 may be configured to perform a computation that is executable via a map-reduce algorithm. For example, the computation may include parallel data processing on an input data set 152 to generate some resulting output 156 using a two-stage approach where: in a "map" step, each worker node applies a map ( ) function to a portion of the input data set 152 and writes an intermediate output 154; and in a "reduce" step, the worker nodes process each group of intermediate output 154 into a final result (output 156). In conventional schemes, a virtual machine would be limited with the resources of the server running the VM. Even if the whole server was dedicated to that virtual machine, the virtual machine cannot extend the CPU of the individual server. In contrast, the computation application 124 is configured to perform the data processing in a manner that utilizes the processing power of the entire server farm.

According to one aspect, each VM 120 may be configured to be a "lightweight" virtual machine. That is, the virtual disk 134 of a VM 120 need not be stored in full on the local storage device 108, but rather, the virtual disk 134 may be backed at least in part by a corresponding virtual disk image 151 stored in the network storage device 150. Moreover, virtual disks 134 of cloned VMs do not need to be a full copy of a disk image stored in local storage 108, but may be a linked clone disk image. In some aspects, all data needed to perform the computation (an input data set 152) are external to the VM, i.e., stored in the network storage device 150.

According to one aspect, to execute a computation, a VM 120 starts running, and loads the computation application 124. For purposes of discussion, this initial VM 120 is referred to as a first VM. The computation application 124 is configured to count how data (input data set 152) should be processed, but instead of creating additional processes or threads for computing, the computation application 124 performs the following technique. The first VM 120 may create a memory region to share data between the first VM and child VMs subsequently created, using distributed shared memory techniques or other inter-process communication mechanics such as pipes-based or network-based techniques. The first VM 120 executes a "virtual machine fork" method ("VM FORK" operation 119) which creates a linked clone of the current virtual machine (VM clone 120A). In this instance, the first VM 120 is referred to as a "parent VM", and the linked clone (VM 120A) is referred to as a "child VM." The VM 120A may subsequently create more clones if needed (in which context the VM 120A is the parent VM), computes a result over the input data set, and returns the result via the shared memory region. After completing its part of the computation and delivering the result to the parent VM, the VM clone 120A may be destroyed.

In one or more aspects, the VM manager 140 may be configured to load balance the VMs 120 over the host servers 101 in the server farm. As such, in response to detecting one of the host servers 101 in the farm becomes polluted with cloned virtual machines, the VM manager 140 may "live migrate" one or more VMs to other free host servers in the farm. Live migration refers to a process in which a running VM is moved from one (source) host server 101 to another (target) host server without shutting down the VM or the host. As the input data set 152 (and other data related to the computation) is stored in the network storage device 150, only memory 132 of the VM needs to be migrated, thereby ensuring in a relatively fast live migration process that does not significantly impact the processing time of the computation. Additionally, the migrated VM may continue cloning itself on the target host server, similar to the cloning actions taken on the source host server 101. Thus, the first VM 120 may utilize the whole farm computation resources without setting up any additional map-reduce software, including multi-component software implementations such as Apache Hadoop.

In one aspect, the computation application 124 is configured to perform a map stage of a computation, starting with a first virtual machine (VM) acting as a parent VM and an input data set. In some aspects, the computation application 124 may clone the parent VM to generate at least one child VM executing on a same host as the parent VM. In some aspects, the computation application 124 may be configured to divide the input data set into a first chunk for the parent VM and a second chunk for the at least one child VM by determining a starting pointer for each chunk.

In some aspects, the computation application 124 (executing on a parent VM) may instantiate a child VM 120A that is a linked clone of the parent VM 120. A linked clone is a copy of a VM that shares virtual disks with the base VM in an ongoing manner. It is noted that because a VM 120 uses a separate data storage (e.g., network storage 150) for storing at least the input data set and other data needed to perform the computations, such data of the VM 120 is not cloned and duplicated.

Virtual Machine Fork

The computation application 124 and VM manager 140 may be configured support a virtual fork technology that instantiates a new (child) VM 120A from an existing (parent) VM 120. As shown in the example pseudocode below, code execution of the parent VM 120 may be paused at invocation of a VM fork call ("vm_id=virtual_machine_fork( )"), and the VM manager 140 initiates a linked clone that is a copy of the executing VM, and then resumes execution of both of them. The parent VM 120 receives a VM identifier of the child VM 120A, while the child VM receives a pre-determined value (0) as a return value of the VM fork call. Subsequently, functionality of each of the parent VM and child VM may be separated using the returned VM identifier values ("if (vm_id !=0)").

```
1 vm_id=virtual_machine_fork( )
2
3 if (vm_id !=0) {
4 // parent VM code
5 }
6 if (vm_id==0) {
7 // child VM code
8 }
```

Listing 1: Example Pseudocode for VM forking

To execute cloning, the (parent) virtual machine 120 may first prepare a unique identifier for the child VM to be created. The unique identifier (UUID) may be unique across all virtual machines in the system. In some aspects, the parent VM 120 may request the VM manager 140 to automatically generate a UUID for the child VM at the time of or prior to creation. In other aspects, the parent VM 120 may generate and provide the UUID to the VM manager 140 at the time of or prior to clone creation. The parent VM may generate the UUID as derived from the UUID of the parent VM itself, such as using a portion of the parent VM's UUID as a root or base value and concatenating an offset value representing the child status.

After preparing the UUID, the parent VM may communication with the VM manager 140, the host OS, or other special tool which can communicate with the VM manager 140 to perform the linked clone process. For example, the computation application 124 may instruct (via an API call to) the VMM 110, which in turn relays instruction to the VM manager 140. In other aspects, the computation application 124 may instruct (via an API call or other IPC channel) the VM manager 140 directly to perform a linked clone procedure to create a child VM.

Next, the parent VM may communicate with the VM manager 140 or host OS and retrieve a result of the cloning process. In some aspects, the retrieved result may be a status indication representing the successful completion (or failure) of the linked clone process. In another aspect, the retrieved result may be the UUID of the cloned VM itself, which the computation application 124 may store for later use, such as by a master node that tracks work performed by UUID.

In some aspects, the computation application 124 may coordinate with the VM manager for cloning using a network-based communications channel. As mentioned above, during setup, the VM manager 140 may announce its IP address to computation application 124. Subsequently, when a VM seeks to execute a cloning process, the VM transmits its identity to the VM manager 140 and waits for a response (e.g., polling, push message, etc.). In one aspect, the VM manager 140 may store the network address (e.g., IP address) of the requestor and determines a VM identifier associated with this network address. Then the VM manager 140 initiates the linked clone procedure. When execution is finished, both cloned VMs asks for the results of the cloning process from the VM manager 140 with the same identity. The VM manager 140 may check the IP address of requests for the result and compare it with the earlier-stored one for identity. If the IP address is the same, the VM manager responds to the result request with a result for the parent VM (e.g., the identifier of the child VM); if different, the VM manager may conclude the results request is from the child VM and sends a response (e.g., a pre-determine value 0).

In other aspects, the computation application 124 may use an interface port (COM port) to communicate with the VM manager 140. When the parent VM 120 is prepared to start running, the VM may set COM port emulation to a pipe with a predefined name based on the VM's identifier. The VM manager 140 may retrieve a list of running VMs and start listening on pipes having those corresponding predefined names. The port-based communication process is similar to the network-based approach described above, except that the VM manager 140 may store the VM pipe name or only an identifier from that name to identify a VM.

In another aspect, the computation application 124 may use a virtual universal serial bus (USB) device to communicate with the VM manager 140. The parent VM 120 may register a USB vendor and device ID, and have a custom driver implemented for the guest OS 122 for the virtual device, and have a driver installed for the host OS. The computation application 124 may connect the virtual USB device to a virtual bus in the host OS and assign it as a pass-through USB device to a specific virtual machine. The virtual-USB-based communication process is similar to the network-based approach described above, except that the VM manager 140 may store the virtual device ID for the VM.

MapReduce Over Cloned VMs

The computation application 124 is configured to execute MapReduce-based computations having (1) a "map" stage, where each worker node (VMs 120) applies a user-specified map( ) function to some local data, and writes the intermediate output to a temporary storage; and (2) a "reduce" stage, where the worker nodes (VMs 120) process the intermediate outputs that are organized into groups (e.g., by a key), in parallel. The computation application 124 may include a master node 126 may be configured to ensure that only one copy of a redundant input data is processed. In general, MapReduce-based computations allow for distributed processing of the map and reduce operations across the plurality of VMs dynamically created within the server farm. Additionally, it is noted that the described techniques are more resource efficient compared to known techniques for computation because the use of VM linked clones for computation does not consume as much memory as a traditional VM.

As described above, the computation application 124 may perform a map stage of a computation, starting with a first VM acting as a parent VM and an input data set 152, by cloning the parent VM 120 to generate at least one child VM 120A, and dividing the input data set 152 into a first chunk for the parent VM and a second chunk for the at least one child VM. The computation application 124 may be configured to process each chunk, using the corresponding first VM 120 or child VM 120A, to generate an intermediate data result, and store each intermediate data result 154 in the network storage device 150. In one aspect, the computation application 124 is configured to perform a reduce stage on the plurality of intermediate data results 154 stored in the network storage device using the first VM 120 and the at least one child VM 120A.

Referring to FIG. 1, the network storage device 150 may be configured to store the initial input data set 152 to the MapReduce computation to be performed. In some aspects, the input data set 152 may be formatted in an arrangement ready for parallel processing by a multitude of worker nodes, i.e., in a data structure having indices, or stored in formatted binary chunks. In alternative aspects, the initial input data set 152 may be stored on a local storage 108 of the host 101 of the first VM, and as VMs are cloned or migrated, the input chunk corresponding to those new VMs may be copied to a destination host as needed.

The network storage device 150 may be further configured to store intermediate output 154 (i.e., intermediate data results generated during the map stage), and the final output 156 of the computation (resulting from the reduce stage). The intermediate output 154 may be stored with input data indices allowing for execution of the reduce step. At an initial time, the first VM 120 may know all indices and chunks that should be processed and can monitor that output data storage for all result data are present. In some aspects, the first VM 120 may include an instance of a master node 126 configured to monitor ensure only one copy of input data is processed, and to recover from failure of any of the worker nodes 127. The network storage device 150 may be communicatively connected to each of the VMs and underlying hosts 101. Network storage device 150 may include one or more Storage Area Networks (SAN) which provision raw block data using a Fibre Channel (FC) network, Network-Attached Storage (NAS) which provide file services over a local area network (LAN), network-accessible databases, data stores, object stores, or other suitable storage systems.

In an aspect, data may be passed from a parent VM to a child VM using the approach embodied by the example pseudocode in Listing 2 below. A chunk of data may be defined by its starting index and ending index of the input data set 152 (i.e., "start_index", "end_index"). A starting index for a given chunk of data to be processed (i.e., data structure "to_process") may be set as an initial pointer to data, and the end index may set as a second pointer, offset from the initial pointer by one step size (i.e., "(step+1)*"). The master node 126 initiates a VM fork (i.e., "vm_id=virtual_machine_fork( )"), and the instance of the child VM processes given chunk of data "to_process" in the branch of execution indicated by the returned VM identifier to (i.e., "if (vm_id==0)").

```
1 struct data {
2 int start_index;
3 int end_index;
4 }
5 . . .
6 struct data to_process={
7 step* step_size,
8 (step+1)* step_size
9 }
10
11 vm_id=virtual_machine_fork( . . . )
12 if (vm_id==0)
13 execute_processing(to_process)
```

Listing 2: Example Pseudocode for Passing Data Between Worker Nodes (VM Clones)

The computation application 124 may be configure to use one of several chunk creation approaches to divide the input data 152 into different chunks for each of the worker nodes 127 to process. As used herein, the term "divide" does not refer to a physical division of data, but rather the setting of pointers to data (e.g., memory address, offsets, indices), which are used to retrieve a physical data chunk from the whole set.

In one approach, the master node 126 of the computation application 124 may be configured to divide the input data 152 into a plurality of chunks having a predetermined chunk size. The first VM 120 may start to clone with setting indices ("to_process") to the child VM 120A. That is, in an iterative manner, the starting and ending indices of the chunk "to_process" are incremented in a step-wise manner for each child VM cloned. After each child VM processes its respective chunk of data, the results are delivered as intermediate output 154 to the network storage 150. The master node 126 may monitor the output data storage and begin the reduce step in response to detecting that all intermediate results are present.

In another approach, the virtual machine(s) 120 may be configured to clone themselves and divide the input data set into chunks in an iterative or recursive manner until one of the following conditions: (1) the chunk size has reached a threshold size, or (2) a maximum number of virtual machines have been created. In some aspects, the threshold minimum chunk size may be determined according to the algorithm. In some aspects, the maximum number of VM clones may be determined by the VM manager 140, for example, or a system administrator).

In an aspect, the computation application 124 may be configured to, starting with a first VM acting as a parent VM and an input data set, clone the parent VM to generate a child VM, and divide the input data set into the first chunk for the parent VM and the second chunk for the child VM, in an iterative or recursive manner. For a next iteration(s), until a threshold size of the input data set has been reached and/or a threshold maximum count of child VMs is reached, each corresponding chunk acts as the input data set; each corresponding VM acts as the parent VM for the next iteration. In an aspect, each of the child VMs is also cloning the parent VM and dividing the input data set in an iterative or recursive manner, with the second chunk acting as the input data set for a next iteration, and with the child VM acting as the parent VM for the next iteration. In some aspects, the computation application 124 may be configure to initiate or perform a live migration of the at least one child VM to a second host, wherein the at least one child VM is cloned in an iterative or recursive manner on the second host, as described above.

FIGS. 2A to 2D are block diagrams illustrating the creation of chunks for parallel processing during a map stage of a computation, according to an exemplary aspect. At an initial state 200 shown in FIG. 2A, a first VM (VM1) is started to perform a computation that processes the initial input data set 202 having a starting index of 0 and ending index of N (i.e., "process(0, N)").

In a first iteration, the VM1 may initiate a VM fork that generates a linked clone VM2. At a next state 210 shown in FIG. 2B, the computation application 124 may divide the initial data set 202 by two (i.e., into two equal portions), resulting in a first chunk 212 and a second chunk 214. The computation application 124 defines the first chunk 212 by setting its starting and end indices as 0 and N/2, respectively, and defines a second chunk 214 by settings its indices N/2 and N. The first chunk 212 is for the parent VM (VM1); and the second chunk is for the child VM (VM2).

Figure 2A:
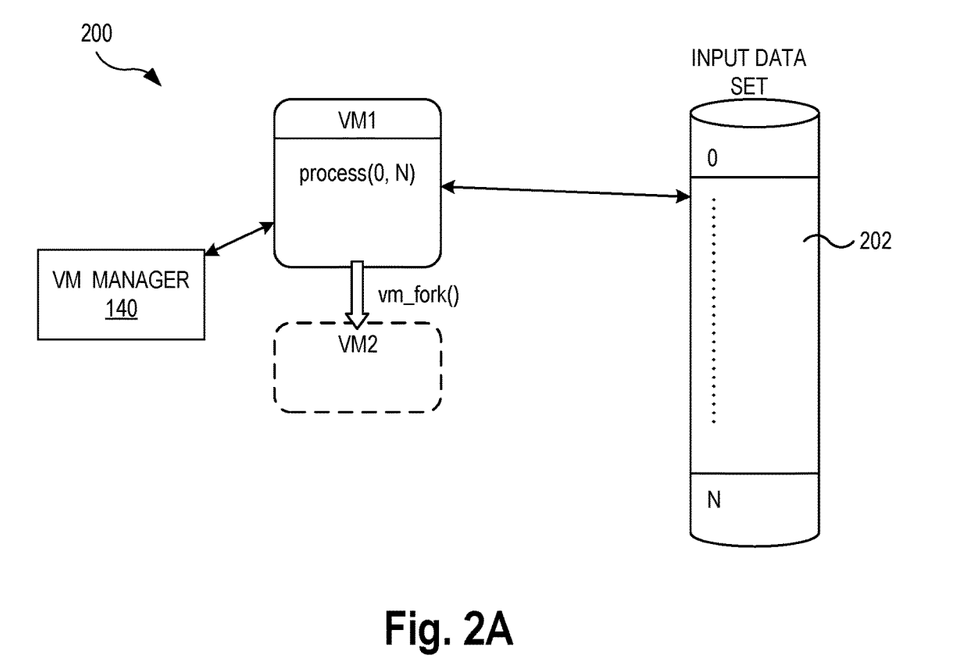
FIGS. 2A to 2D are block diagrams illustrating the creation of chunks for parallel processing during a map stage of a computation, according to an exemplary aspect.
Figure 2B:
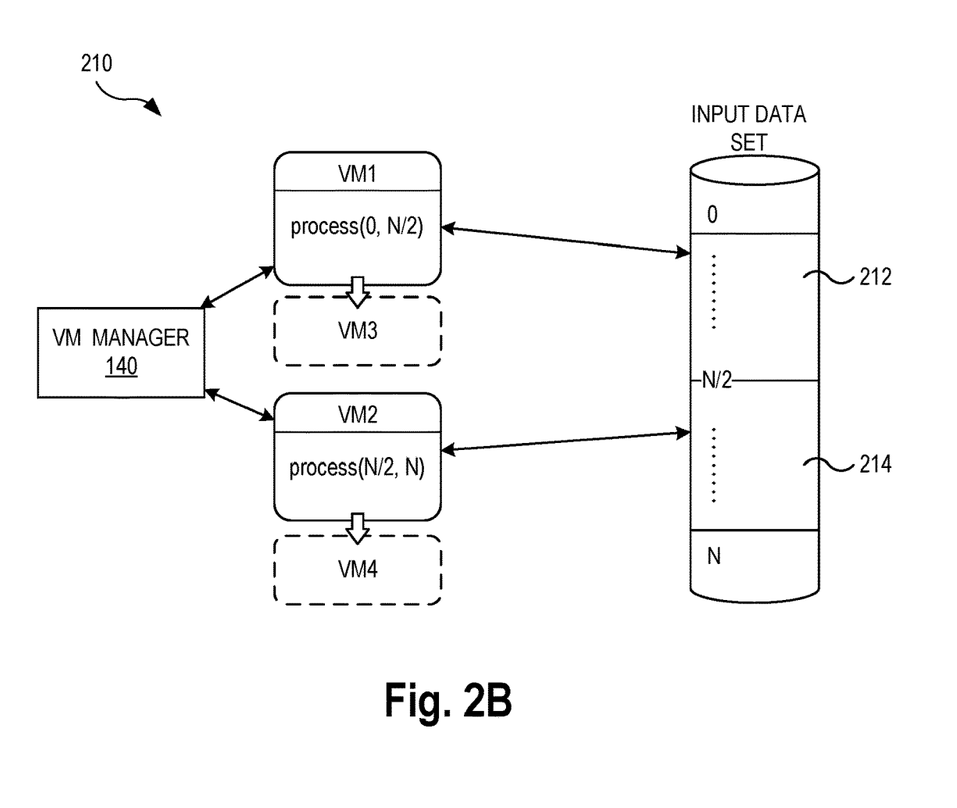
Figure 2C:
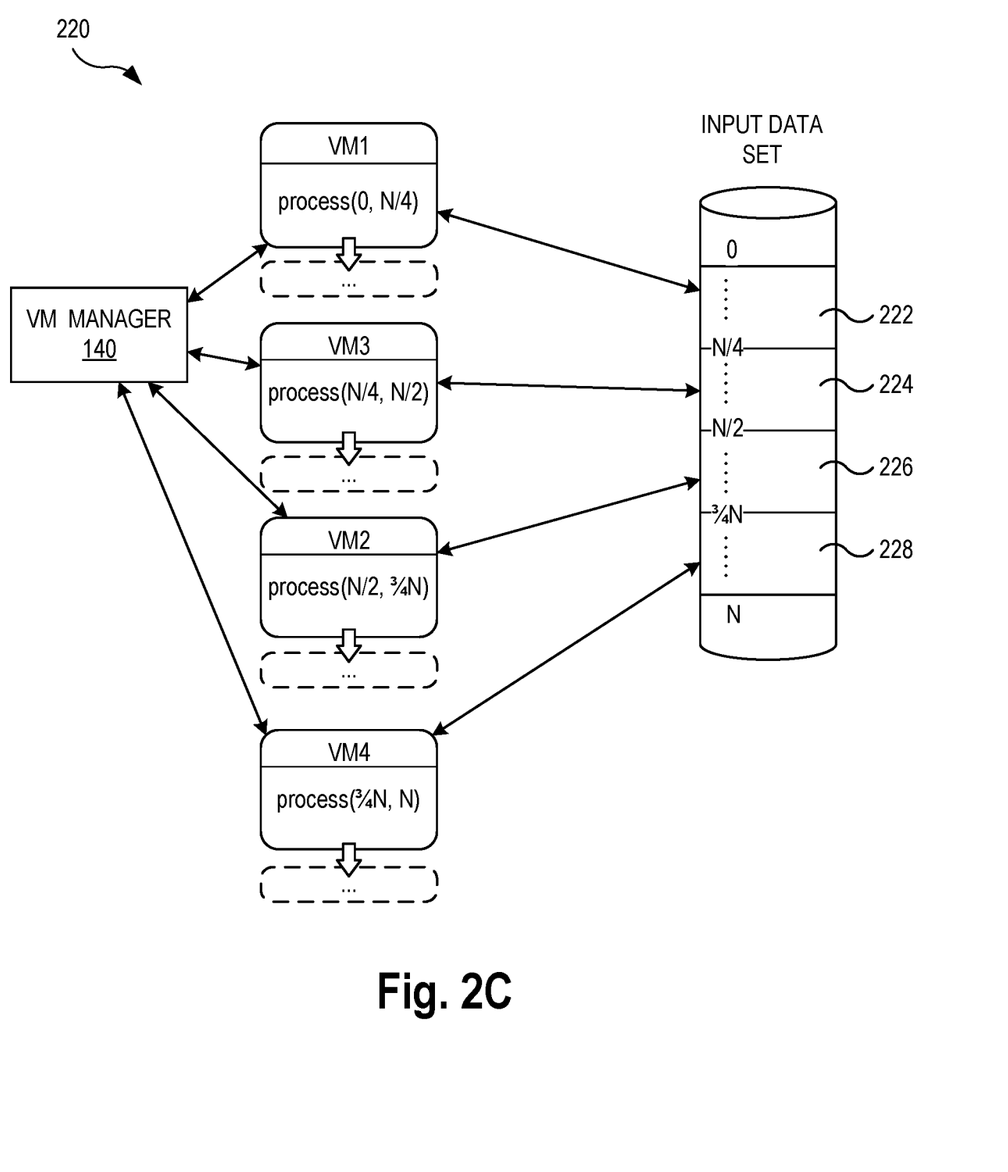
Figure 2D:
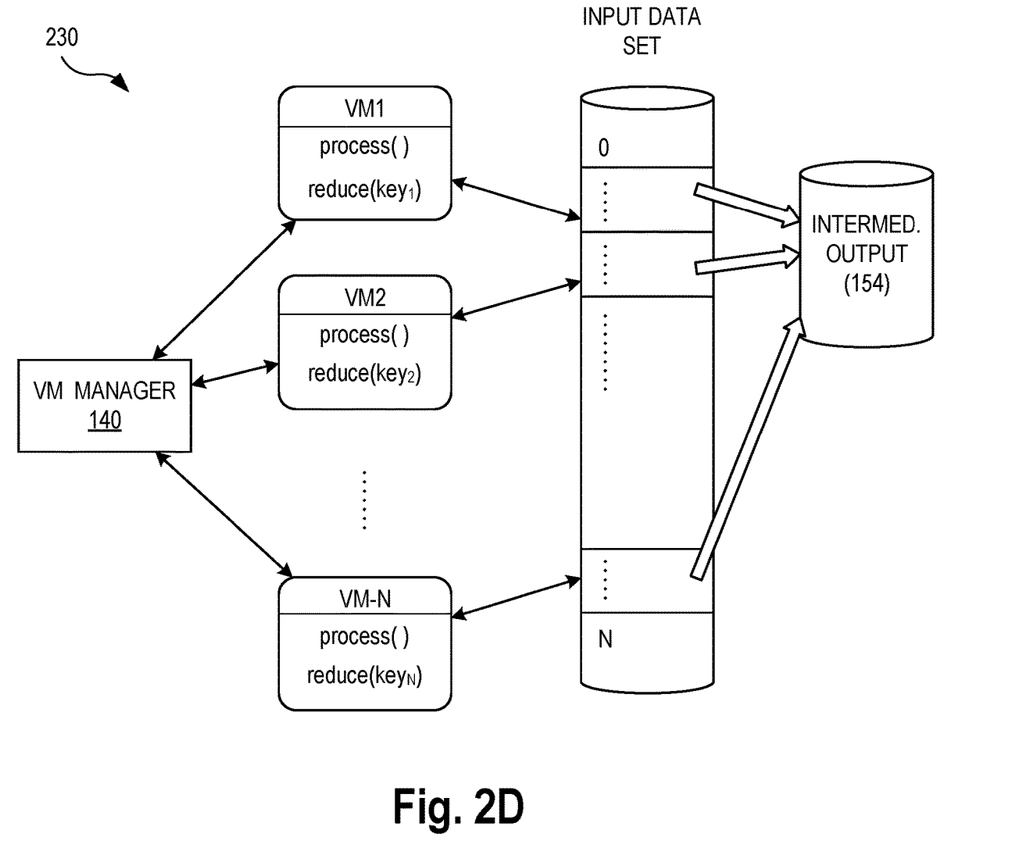

At a next iteration, both VMs divide their respectively datasets by two and are cloned again. The resulting state 220 is depicted in FIG. 2C. As shown, VM1 has been cloned to create VM3, and VM2 has been cloned to create VM4. Chunk 212 has been divided into chunks 222 and 224, for VM1 and VM3, respectively; chunk 214 has been divided chunks 226 and 228, for VM2 and VM4, respectively. This loop continues until the chunk size is small enough (according to a threshold size), or a maximum count of VMs have been reached. At the generalized state 230 depicted in FIG. 2D, the first VM (VM1) and a plurality of child VMs (VM2 to VM-N) proceed to process the corresponding chunk of input data to generate some intermediate data result 154. The initial (master) VM1 may monitor the output data storage after its completed its work, and when all results are present in storage, direct the first VM and the plurality of child VMs to execute the reduce step.

While aspects of the present disclosure describe the use of a network storage device 150 to pass input data and results from the map stage (e.g., input data set 152, intermediate output 154) between nodes, it is understood that alternative aspects may use other forms of inter-node communication, such as a network-based approach, for a cloned VM to send data back to the initial VM. In one aspect, the initial VM may store its network address (e.g., IP address) in its memory, set predefined chunks of the input data set, start cloning, and wait for results. The VM clones "receive" the network address as a result of the information being retained in the copy of the initial VM's memory. When a VM clone has finished processing its chunk of input data, the VM clone may transmit the intermediate results to the initial VM using a network connection established using the network address of the initial VM. When all cloned VM's have delivered their results back, the reduce step may be executed, as described above.

Figure 3:
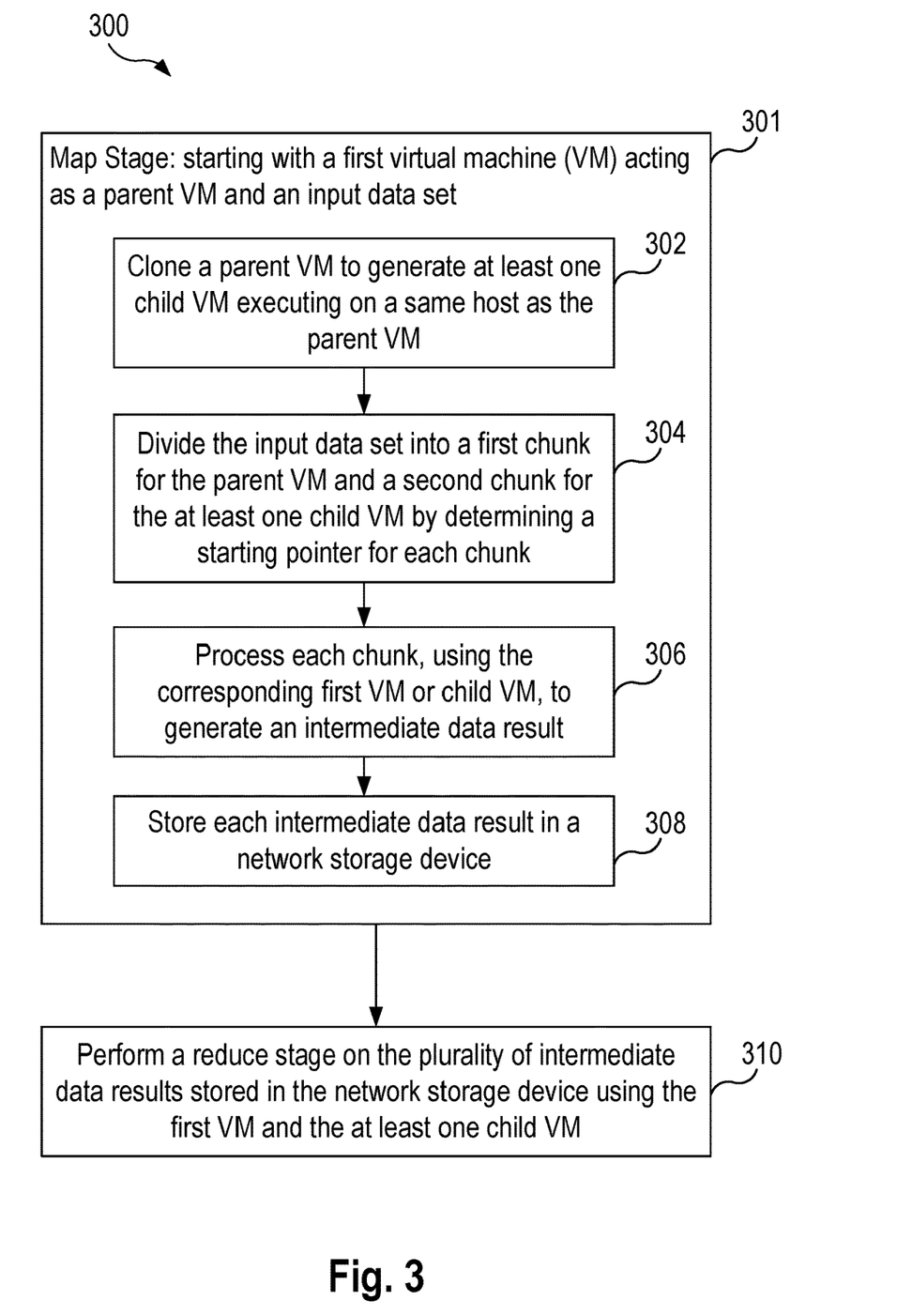
FIG. 3 is a flowchart illustrating a method for parallel processing an input data set, according to an exemplary aspect.

FIG. 3 is a flowchart illustrating a method 300 for parallel processing an input data set according to an exemplary aspect. It is noted that the following description of the exemplary method makes reference to the system and components described above. The method 300 begins at step 301, in which the computation application 124 may perform a map stage of a computation, starting with a first virtual machine (VM) acting as a parent VM and an input data set, by performing the process seen in steps 302-308.

At step 302, the computation application 124 may clone the parent VM to generate at least one child VM. The child VM comprises a linked clone VM executing on a same host as the parent VM. In some aspects, the computation application 124 may perform a live migration of the at least one child VM to a second host, wherein the at least one child VM is cloned in an iterative or recursive manner on the second host.

At step 304, the computation application 124 may divide the input data set into a first chunk for the parent VM and a second chunk for the at least one child VM by determining a starting pointer for each chunk. In some aspects, the computation application 124 may divide the input data into a plurality of chunks having a predetermined chunk size, wherein the plurality of chunks includes the first chunk and the second chunk.

In some aspects, cloning the parent VM and dividing the input data set may include cloning the parent VM to generate a child VM, and dividing the input data set into the first chunk for the parent VM and the second chunk for the child VM, in an iterative or recursive manner, and until a threshold size of the input data set has been reached. Each corresponding chunk may act as the input data set for a next iteration, and each corresponding VM may act as the parent VM for the next iteration. In some aspects, the input data set is iteratively divided into two equal portions. In some aspects, the computation application 124 may clone the parent VM to generate a child VM, and dividing the input data set into the first chunk for the parent VM and the second chunk for the child VM, in an iterative or recursive manner, with the first chunk acting as the input data set for a next iteration, and until a threshold size of the input data set has been reached.

At step 306, the computation application 124 may process each chunk, using the corresponding first VM or child VM, to generate an intermediate data result. At step 308, the computation application 124 may store each intermediate data result in a network storage device. At step 310, the computation application 124 may perform a reduce stage on the plurality of intermediate data results stored in the network storage device using the first VM and the at least one child VM.

Figure 4:
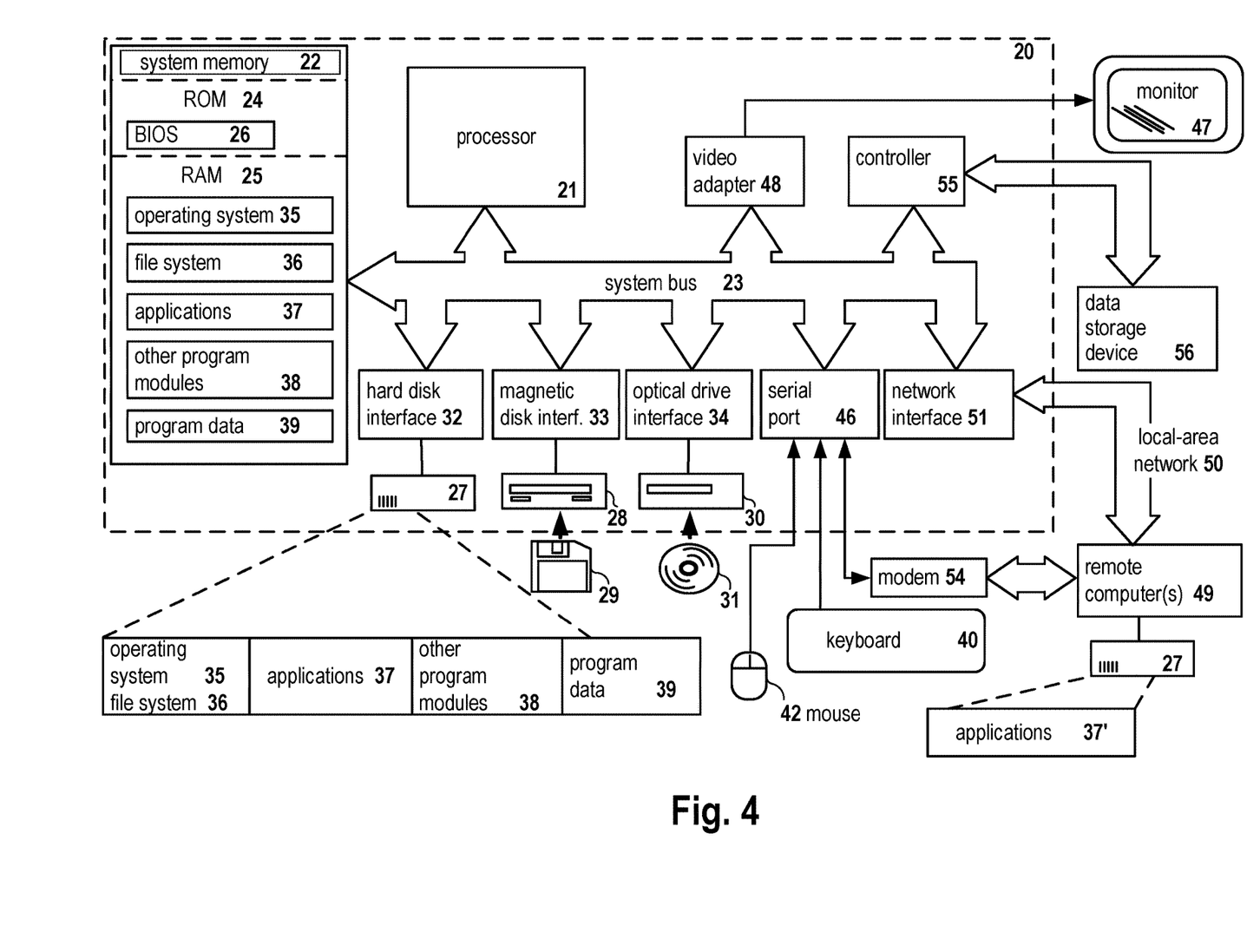
FIG. 4 is a block diagram of a general-purpose computer system on which the disclosed system and method can be implemented according to an exemplary aspect.

FIG. 4 is a block diagram illustrating a general-purpose computer system 20 on which aspects of systems and methods for parallel processing an input data set may be implemented in accordance with an exemplary aspect. It should be noted that the computer system 20 can correspond to the physical host servers 101, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for parallel processing an input data set, comprising:
    performing a map stage of a computation, on an input data set, using a first virtual machine (VM), by:
        performing a plurality of iterations, wherein each of the plurality of iterations comprises:
            generating at least one child VM, wherein the at least one child VM comprises a linked clone of the first VM or a linked clone of a child VM generated during a previous iteration of the plurality of iterations, and
            assigning, for processing by the at least one child VM, a chunk of the input data set, by determining a starting pointer for the assigned chunk,
        wherein the plurality of iterations is performed until a threshold size of the chunk of the input data set has been reached,
        processing the input data set, using the first VM and the generated child VMs, to generate an intermediate data result, and
        storing each intermediate data result in a network storage device; and
    performing a reduce stage on the stored intermediate data results using the first VM and one or more child VMs generated during at least one iteration of the plurality of iterations.

2. The computer-implemented method of claim 1, wherein the chunk of the input data set has a predetermined chunk size.

3. The computer-implemented method of claim 1, wherein assigning, for processing by the at least one child VM, the chunk of the input data set comprises dividing a chunk of the input data set assigned during the previous iteration of the plurality of iterations.

4. The computer-implemented method of claim 3, wherein the chunk of the input data set assigned during the previous iteration of the plurality of iterations is divided into two equal portions.

5. The computer-implemented method of claim 1, wherein the plurality of iterations is stopped when a threshold maximum count of child VMs is reached.

6. The computer-implemented method of claim 1, further comprising:
    performing a live migration of a first VM of the at least one child VM to a second host.

7. A system for parallel processing an input data set, comprising:
    a hardware processor configured to:
        perform a map stage of a computation, starting with a first virtual machine (VM) acting as a parent VM and an input data set, by:
            cloning the parent VM to generate at least one child VM in an iterative or recursive manner, wherein the child VM comprises a linked clone VM executing on a same host as the parent VM, with each corresponding VM acting as the parent VM for a next iteration,
            dividing the input data set into a first chunk for the parent VM and a second chunk for the at least one child VM by determining a starting pointer for each chunk, with each corresponding chunk acting as the input data set for the next iteration until a threshold size of the input data set has been reached,
            processing each chunk, using the corresponding first VM or child VM, to generate an intermediate data result, and
            storing each intermediate data result in a network storage device; and
        perform a reduce stage on the intermediate data results stored in the network storage device using the first VM and the at least one child VM.

8. The system of claim 7, wherein the processor configured to divide the input data set is further configured to:
    divide the input data set into a plurality of chunks having a predetermined chunk size, wherein the plurality of chunks includes the first chunk and the second chunk.

9. The system of claim 7, wherein the processor configured to clone the parent VM and divide the input data set is further configured to:
    clone the parent VM to generate a child VM, and divide the input data set into the first chunk for the parent VM and the second chunk for the child VM, in the iterative or recursive manner, with each corresponding chunk acting as the input data set for a next iteration, and with each corresponding VM acting as the parent VM for the next iteration.

10. The system of claim 9, wherein each of the child VMs is also performing the step of cloning the parent VM and dividing the input data set in the iterative or recursive manner, with the second chunk acting as the input data set for a next iteration, and with the child VM acting as the parent VM for the next iteration.

11. The system of claim 9, wherein the input data set is iteratively divided into two equal portions.

12. The system of claim 9, wherein the processor is configured to clone the parent VM and divide the input data until a threshold maximum count of child VMs is reached.

13. The system of claim 7, wherein the processor is further configured to:
- perform a live migration of the at least one child VM to a second host, wherein the at least one child VM is cloned in the iterative or recursive manner on the second host.

14. A non-transitory computer readable medium comprising computer executable instructions for parallel processing an input data set, including instructions for:
- performing a map stage of a computation, starting with a first virtual machine (VM) acting as a parent VM and an input data set, by:
  - cloning the parent VM to generate at least one child VM in an iterative or recursive manner, wherein the child VM comprises a linked clone VM executing on a same host as the parent VM, with each corresponding VM acting as the parent VM for a next iteration,
  - dividing the input data set into a first chunk for the parent VM and a second chunk for the at least one child VM by determining a starting pointer for each chunk, with each corresponding chunk acting as the input data set for the next iteration until a threshold size of the input data set has been reached,
  - processing each chunk, using the corresponding first VM or child VM, to generate an intermediate data result, and
  - storing each intermediate data result in a network storage device; and
- performing a reduce stage on the intermediate data results stored in the network storage device using the first VM and the at least one child VM.

15. The non-transitory computer readable medium of claim 14, wherein the instructions for cloning the parent VM and dividing the input data set further comprises instructions for:
- cloning the parent VM to generate a child VM, and dividing the input data set into the first chunk for the parent VM and the second chunk for the child VM, in the iterative or recursive manner, with each corresponding chunk acting as the input data set for a next iteration, and with each corresponding VM acting as the parent VM for the next iteration.

16. The non-transitory computer readable medium of claim 14, further comprising instructions for:
- performing a live migration of the at least one child VM to a second host, wherein the at least one child VM is cloned in the iterative or recursive manner on the second host.

* * * * *